(12) United States Patent
Launay et al.

(10) Patent No.: US 6,545,603 B1
(45) Date of Patent: Apr. 8, 2003

(54) MEASURING DEVICE USING AN INDIRECT MEASUREMENT OF PERMITTIVITY

(76) Inventors: Claude Launay, 8, rue du Docteur Bring, 94500 Champigny-sur-Marne (FR); Daniel Le Reste, 26, rue des Coquelicots, 77164 Ferrières-en-Brie (FR); Pascal Jordana, 2, rue d'Athènes, 94510 La Queue-en-Brie (FR); William Panciroli, 11, rue d'Ablis, 78660 Prunay-en-Yvelines (FR)

( * ) Notice: Subject to any disclaimer, the term of this patent is extended or adjusted under 35 U.S.C. 154(b) by 0 days.

(21) Appl. No.: 09/830,318
(22) PCT Filed: Oct. 21, 1999
(86) PCT No.: PCT/FR99/02561
§ 371 (c)(1),
(2), (4) Date: Apr. 23, 2001
(87) PCT Pub. No.: WO00/25098
PCT Pub. Date: May 4, 2000

(30) Foreign Application Priority Data

Oct. 23, 1998 (FR) .......................................... 98 13329

(51) Int. Cl.[7] .............................................. G08B 21/00
(52) U.S. Cl. ........................................ 340/540; 340/620
(58) Field of Search ................................ 340/540, 620, 340/562, 603, 606, 612, 618; 73/718, 304 C, 361; 324/76.6, 76.7

(56) References Cited

U.S. PATENT DOCUMENTS

| 3,580,074 A | * | 5/1971 | Wescott et al. | ........... 73/304 C |
| 4,485,673 A | * | 12/1984 | Stern | .................. 73/304 C |
| 5,629,629 A | * | 5/1997 | Tielert et al. | ............... 324/679 |

FOREIGN PATENT DOCUMENTS

| EP | 34 13 849 A | 8/1985 |
| EP | 43 12 432 A 1 | 10/1994 |
| EP | 44 34 338 A 1 | 3/1996 |

OTHER PUBLICATIONS

Huang S M, et al.: "Tomographic imaging of two–component flow using capacitance sensors" Journal of Physics E. Scientific Instruments, vol. 22, No. 3, Mar. 1, 1989.

* cited by examiner

Primary Examiner—Daniel J. Wu
Assistant Examiner—Son Tang
(74) Attorney, Agent, or Firm—Blakely Sokoloff Taylor & Zafman

(57) ABSTRACT

Measuring device is presented employing indirect measurement of permittivity and including two electrically conductive bodies respectively constituting a measuring probe and a reference probe, electrical power supply means adapted to deliver a DC electrical voltage of controlled amplitude, an integrator stage including a capacitor switching system and control means adapted to define a cyclic series of two sequences at a controlled frequency.

47 Claims, 11 Drawing Sheets

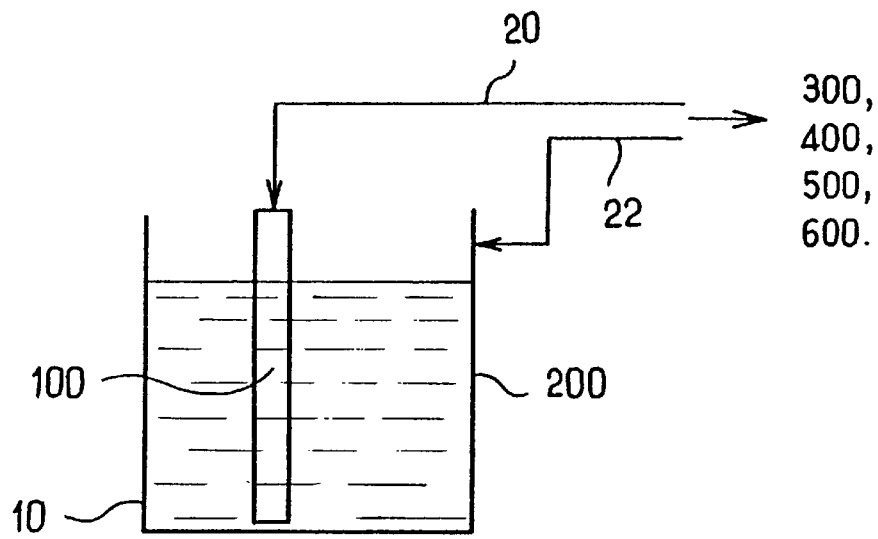
FIG_5
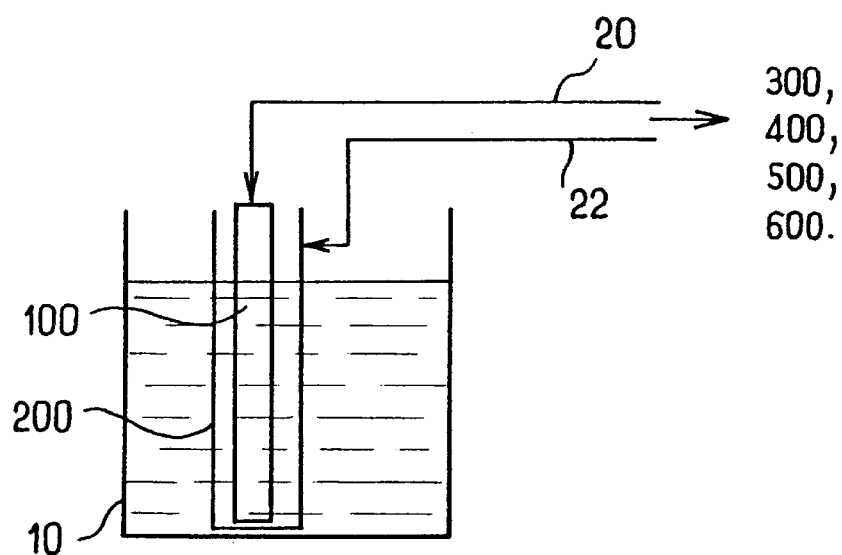
FIG_6
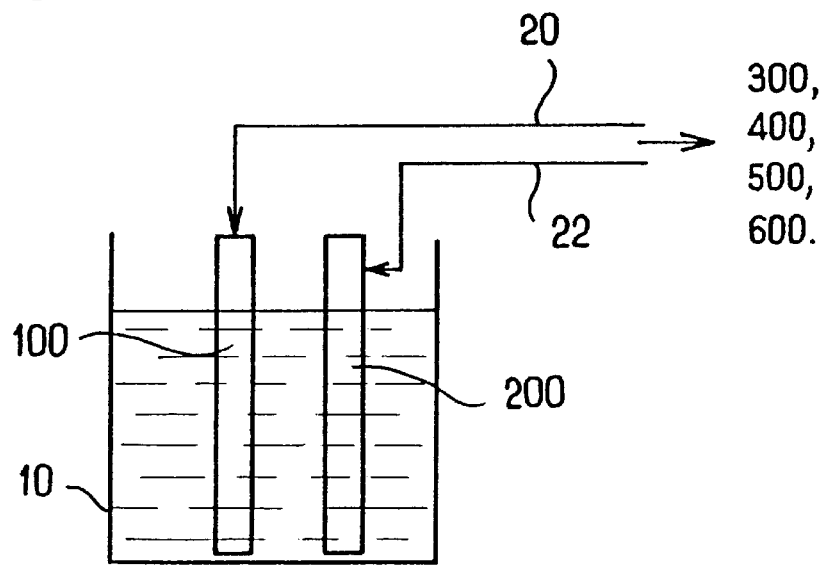
FIG_7

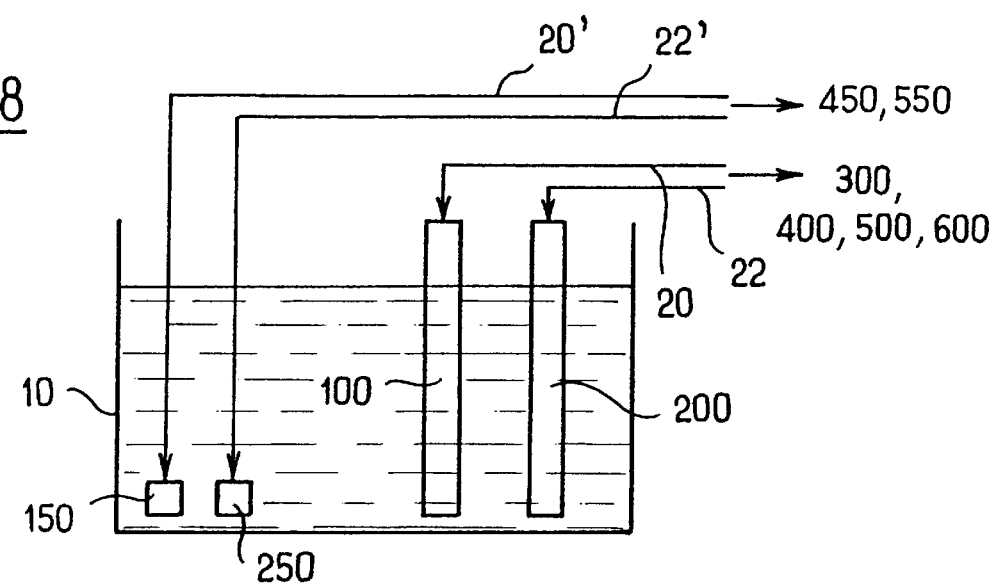
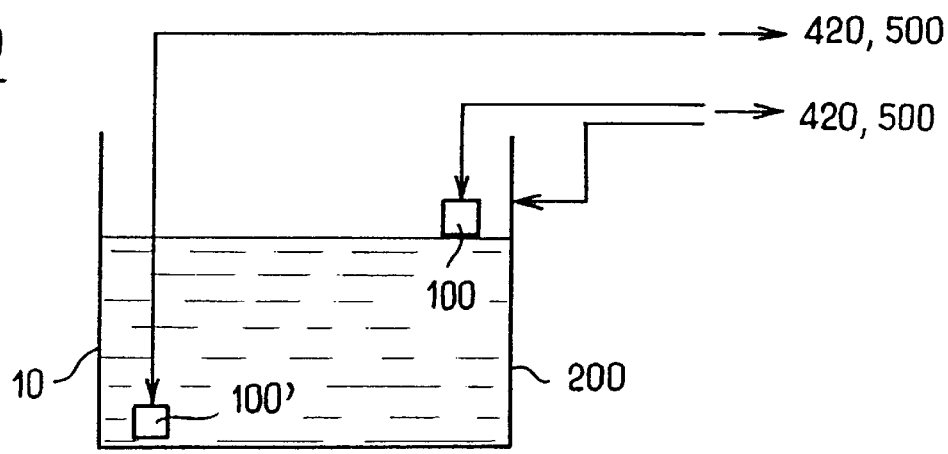
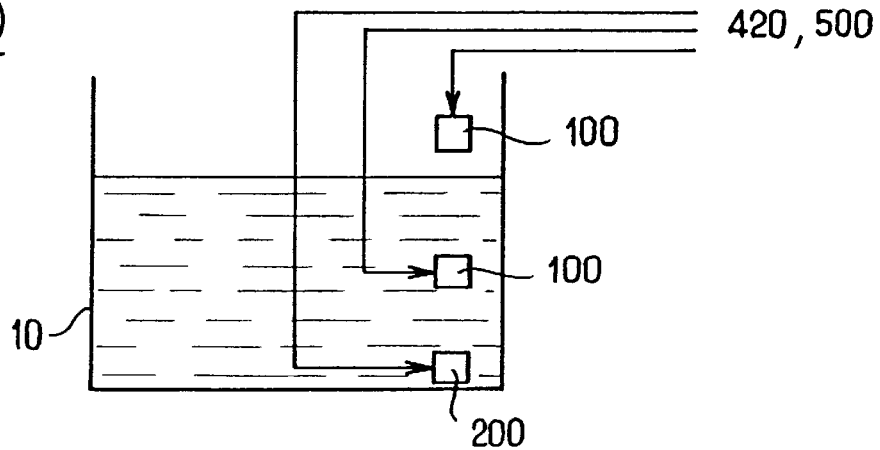

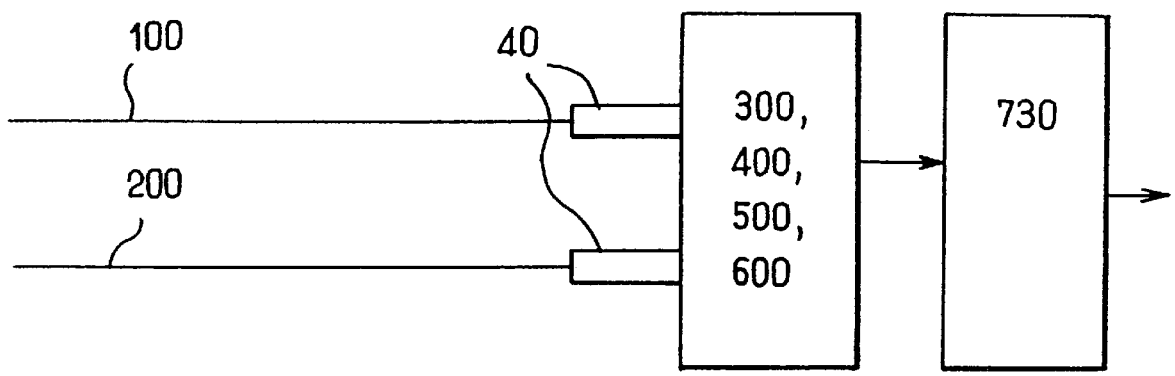
FIG_15
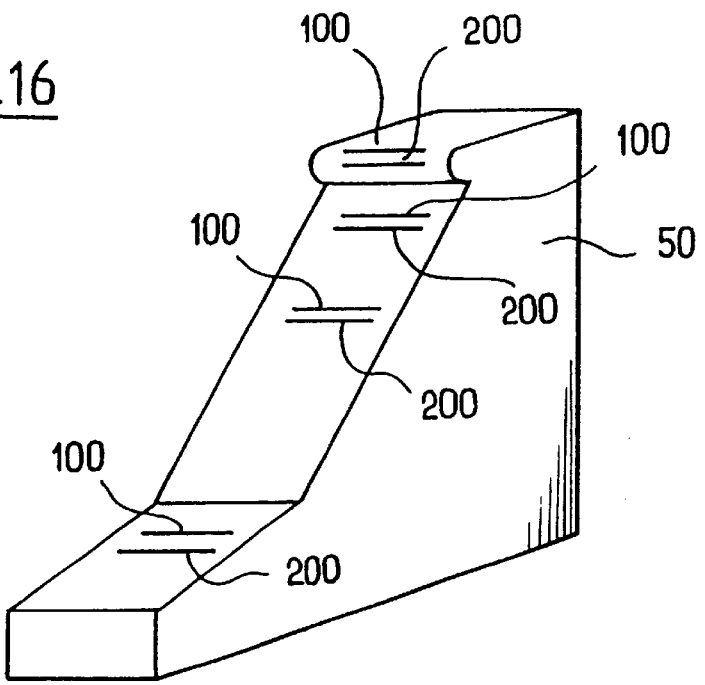
FIG_16

MEASURING DEVICE USING AN INDIRECT MEASUREMENT OF PERMITTIVITY

BACKGROUND OF THE INVENTION

1. Field of the Invention

The present invention relates to sensors.

To be more precise, the present invention relates to a measuring device using an indirect measurement of permittivity between two electrically conductive bodies respectively forming a measuring probe and a reference probe.

2. Description of Related Art

There are many sensors based on measuring permittivity or of the capacitive type.

In particular, there are many devices in which a measuring capacitor is connected to an oscillator circuit so that the output frequency of that circuit depends on the capacitance of the measuring capacitor, enabling determination of a parameter influencing the permittivity of the capacitor, for example the level of a liquid contained in a tank in which the measuring capacitor is placed (see, for example, documents WO-A-98/02718, DE-A-4312432 and DE-A-4434338).

Various devices have also been proposed which comprise a measuring capacitor connected to the input of an integrator stage (see, for example, DE-A-3413849 and Journal of Physics E. Scientific Instruments, vol. 22, no 2, 1989). However, these devices have not proved satisfactory until now and for this reason have not been used industrially.

The documents FR-A-2205669, FR-A-2605731, FR-A-2447555, FR-A-2737297, EP-A-0378304 and EP-A-0644432 describe various devices for measuring the time to charge or discharge a measuring capacitor influenced by the parameter to be detected.

Other capacitive measuring devices are described in the documents FR-A-2763124, FR-A-1152556 and U.S. Pat. No. 3,706,980.

The object of the present invention is to propose new detector means of very high sensitivity.

Another object of the present invention is to propose detector means suited to many applications.

BRIEF SUMMARY OF THE INVENTION

The above targets are achieved in the context of the present invention by a measuring device employing indirect measurement of permittivity and characterized in that it includes two electrically conductive bodies respectively constituting a measuring probe and a reference probe, electrical power supply means adapted to deliver a DC electrical voltage of controlled amplitude, an integrator stage including a capacitor switching system and control means adapted to define a cyclic series of two sequences at a controlled frequency, namely a first sequence during which the electrical power supply means are connected to the measuring probe to apply an electric field between the measuring probe and the reference probe and accumulate electrical charge on the measuring probe and a second sequence during which the electrical power supply means are disconnected from the measuring probe which is connected to a summation point of the integrator stage to transfer its charge into the integrator stage and obtain at the output thereof a signal representative of the permittivity between the measuring probe and the reference probe.

According to another and advantageous feature of the present invention the control means are adapted to apply a stepped voltage to the measuring probe.

According to another and advantageous feature of the present invention the integrator stage includes an operational amplifier, a first integrator capacitor of high capacitance constituting a feedback capacitor of said amplifier and a second capacitor switched between the output and the input of the operational amplifier at the timing rate of the sequences controlled by the control means.

According to another and advantageous feature of the present invention the device includes means for applying a null average voltage to the measuring probe.

According to another and advantageous feature of the present invention the operational amplifier receives on a second input opposite that adapted to be connected sequentially to the measuring probe a voltage of opposite sign to the voltage applied by the power supply means to the measuring probe.

According to another and advantageous feature of the present invention the amplitude of the voltage applied to the second input of the operational amplifier is equal to p.E where E is the amplitude of the voltage applied to the measuring probe during the time T1 and p is the duty factor between the two sequences T1 and T2, i.e. T1=p.T2.

BRIEF DESCRIPTION OF THE DRAWINGS

Other features, aims and advantages of the present invention will become apparent on reading the following detailed description with reference to the accompanying drawings, which are given by way of non-limiting example, and in which:

FIGS. 5 to 13 show various embodiments of devices according to the present invention designed to detect the level in a tank, FIG. 15 shows an application to intruder detection, FIG. 16 shows an application to detecting the presence and or the position of a user on a seat.

DETAILED DESCRIPTION OF THE INVENTION

Figure 1:
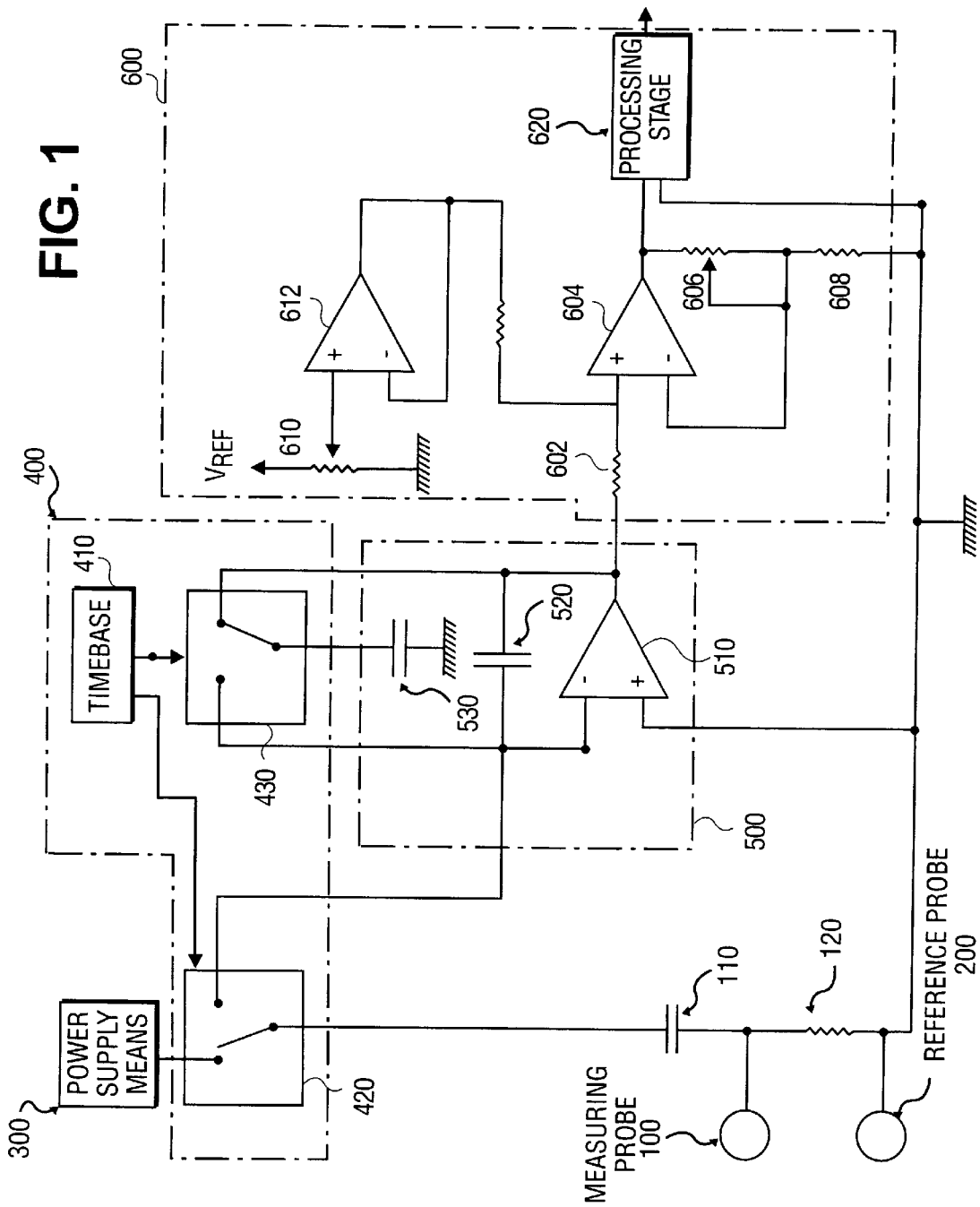
FIG. 1 is a diagrammatic representation of the structure of a measuring device constituting a first embodiment of the present invention.

As previously indicated, the device shown in FIG. 1 essentially comprises:

a measuring probe 100, a reference probe 200, electrical power supply means 300, control means 400 and an integrator stage 500.

The measuring probe 100 and the reference probe 200 are each formed of an electrically conductive body. The latter are spaced to define at least one dielectric medium between them. Various examples of such probes 100 and 200 are described in further detail later.

The power supply means 300 are adapted to deliver a DC electrical voltage of controlled amplitude E.

The control means 400 are adapted to define a cyclic series of two sequences at a control frequency f. During a first sequence of duration T1 the electrical power supply means 300 are connected to the measuring probe 100 to apply an electric field between the measuring probe 100 and the reference probe 200 and to accumulate electrical charge on the measuring probe 100. The capacitance between the measuring probe 100 and the reference probe 200 is charged during a very short time period defined by $\tau=\epsilon/\gamma$, where $\epsilon$ is the permittivity and $\gamma$ is the conductivity of the medium between the two probes 100 and 200. Then, during a second sequence of duration T2, the electrical power supply means 300 are disconnected from the measuring probe 100, which is connected to the input of the integrator stage 500. The control means 400 therefore apply between the measuring probe 100 and the reference probe 200 a low-intensity pulsed electric field of controlled amplitude and duration. This method of deactivating the electric field applied to the measuring probe 100 (by a sudden interruption, as opposed to a progressive reduction in the voltage) immobilizes the electrical charge previously accumulated on the measuring probe 100. The electrical charges on the measuring probe 100 at the end of the first sequence T1 are proportional to the value of the permittivity between the probes 100 and 200. These charges are transferred into the integrator stage 500 (to be more precise into the capacitor switching system) in a manner described in more detail later. There is therefore obtained at the output of the stage 500 a signal which is representative of the permittivity between the measuring probe 100 and the reference probe 200.

In the embodiment shown in FIG. 1, the control means 400 include a timebase 410 formed for example by an oscillator and two two-way switches 420, 430.

The switch 420, controlled by the timebase 410, is adapted to connect the measuring probe 100 alternately to the power supply means 300 during the sequences T1 and then to the input of the integrator stage 500 during the sequences T2.

If necessary, a capacitive injector 110 can be inserted between the measuring probe 100 and the switch 420.

Similarly, if necessary, a resistive injector 120 can be inserted between the measuring probe 100 and the reference probe 200. The resistance of the injector 120 must be very high in order not to cause a leakage current that could interfere with the measurement.

The integrator stage 500 shown in FIG. 1 includes an operational amplifier 510 and two capacitors whose values are known: one capacitor 520 is connected between the inverting input and the output of the amplifier 510 and constitutes a feedback capacitor and the other capacitor 530 has a first terminal connected to the same potential as the reference probe 200 and the non-inverting input of the amplifier 510, i.e. the ground of the circuit, and a second pin controlled by the control means 400 so that it is connected alternately to the inverting input of the amplifier 510 during the time T2 to transfer the charges accumulated on the measuring probe 100 into the capacitor 530 and then to the output of the amplifier 510 during the time T1 to deliver an electric signal proportional to the charge accumulated on the measuring probe 100.

The feedback capacitor 520 connected to the operational amplifier 510 converts it into an integrator. It gets a DC voltage proportional to the charges developed on the measuring probe 100 and thereby prevents unwanted interference voltages.

The integration capacitor 520 typically has a capacitance at least 1000 times the capacitance of the switching capacitor 530 in the case of an analog measurement requiring high accuracy, for example a level measurement.

As an alternative to this, however, for a faster measurement, C520 can be of the same order of magnitude as C530, for example C520 can be two to three times C530. In this case the measurement is not so accurate but can track fast changes.

Switching the measuring probe 100 to a summing point S of an operational amplifier 510 has two advantages. Because the summing point (S) of the amplifier 510 has a null virtual impedance, the probe 100 is totally discharged of the accumulated charge during the time T2, returning it to a null potential for a new measurement during the time T1. Also, all of the charge is transferred into the capacitor switching system 520, 530 without losses, making the measurement perfectly linear.

In more detail, the integrator stage 500 operates in the following manner.

Assume that initially the integration capacitor C520, the switching capacitor C530 and the capacitor Cs formed between the measuring probe 100 and the reference probe 200 are all totally discharged, so that:

$QC520=0$ $QC530=0$ $QCs=0$

During the first sequence T1, the capacitor Cs is charged to the supply voltage delivered by the module 300, which here is assumed to be equal to −E.

Thus at the end of the sequence T1:

$QCs=-E.Cs$ $QC520=0$ $QC530=0$

During the next sequence T2, the charge is transferred from Cs to C520; because the charge is conserved and Cs and C530 are connected to the inverting input of the operational amplifier 510 with a null virtual impedance:

$-E.Cs=V_{s2}.C520$ where $V_{s2}$ is the output voltage of the operational amplifier 510 during the sequence T2.

During the next sequence T1, the two capacitors C520 and C530 are connected in parallel. Thus:

$V_s=V_{s2}.C520/(C520+C530)=QC530/C530=QC520/C520$ so:

$QC530=[V_{s2}.C520/(C520+C530)].C530$ i.e.

$QC530=[V_{s2}/(1+C530/C520)].C530$

Thus if:

$$C520 = nC530 \gg C530$$

then:

$$QC530 \sim V_{s2}.C530$$

In the next sequence T2, the charges on C530 are the opposite of the charges on Cs. The remainder of the charges from Cs are transferred into C520, etc.

The output voltage $V_s$ of the operational amplifier 510 increases progressively to a balancing voltage $$V_s \text{ balancing} = QC530/C530$$

such that:

$$QC530 = V_s \text{ balancing}.C530 - E.Cs$$

Thus after x iterations the device reaches equilibrium at the summation point. The charges QC530 from C530 balances the charges from the probe Cs.

Immediately any variation of capacitance Cs is detected, the additional (or lost) charge on Cs charges (or discharges) the capacitor C520.

Thus under steady state conditions the switching capacitor C530 balances variations of the charge on the probe Cs.

The foregoing operation presupposes that the switches 420, 430 are perfectly synchronized, i.e. in particular that at the start of the sequences T2 the switching capacitor C530 and the measuring probe Cs are simultaneously connected to the summation point of the operational amplifier 510.

In the context of the invention, the switching capacitor C530 always has a capacitance of the same order of magnitude as the capacitance Cs defined between the measuring probe 100 and the reference probe 200, that is to say, preferably:

$$0.1Cs < C530 < 10Cs$$

advantageously:

$$0.5Cs < C530 < 5Cs$$

and highly advantageously:

$$Cs \sim C530$$

In an advantageous embodiment of the invention, the timebase 410 generates a fixed frequency (f) at a duty factor of 50% delivering two periods (T1) and (T2) which are strictly identical (T1=T2) with f=1/(T1+T2).

Because the times T1 and T2 are strictly identical, the medium-term drift in the frequency f generated by the oscillator 410 does not affect the accuracy of the measurement.

The repetition frequency f of the measurement is typically of the order of 5 to 50 kHz.

The signal available at the output of the integrator stage 500 can be used in various ways.

The structure of the output stage 600 shown in FIG. 1 will now be described.

In the particular embodiment shown in FIG. 1, the output of the operational amplifier 510 is connected via a resistor 602 to the non-inverting input of an operational amplifier 604. This is configured as a follower stage. To this end, the inverting input of the operational amplifier 604 is connected to its output via a variable resistor 606. The inverting input of the operational amplifier 604 is also connected to ground via a resistor 608.

The gain of the operational amplifier 604 can be tuned by the variable resistor 606, for example to adjust the output voltage of the circuit to the required full-scale range.

The non-inverting input of the operational amplifier 604 also receives a variable voltage for the zero adjustment.

That voltage is formed from a voltage VREF which is preferably identical to that delivered at the output of the power supply means 300. The voltage VREF is applied to the terminals of a potentiometer 610 whose variable output drives the non-inverting input of an operational amplifier 612. The latter has its inverting input connected to its output which is connected to the non-inverting input of the operational amplifier 604 via a resistor 614 of the same value as the aforementioned resistor 602. The very high impedance non-inverting input of the operational amplifier 604 therefore receives a voltage of opposite sign to the measuring slope, to enable zero adjustment by means of the potentiometer 610.

Note that generating this voltage from the reference voltage VREF applied to the. measuring probe 100 eliminates the effect of any drift in the reference voltage. This is because, if the reference voltage VREF should drift, the voltage applied to the non-inverting input of the operational amplifier 604 drifts in the same direction, so eliminating any risk of the zero point drifting.

The output of the operational amplifier 604 can be connected to a processing stage 620, for example a 4–20 mA current loop or a signal processing stage for generating a spectrum characterizing the signal, for example to enable recognition of an analysed product.

One example of processing means for generating a spectrum of this type is described hereinafter with reference to FIG. 4.

The embodiment shown in FIG. 2 will now be described.

Figure 2:
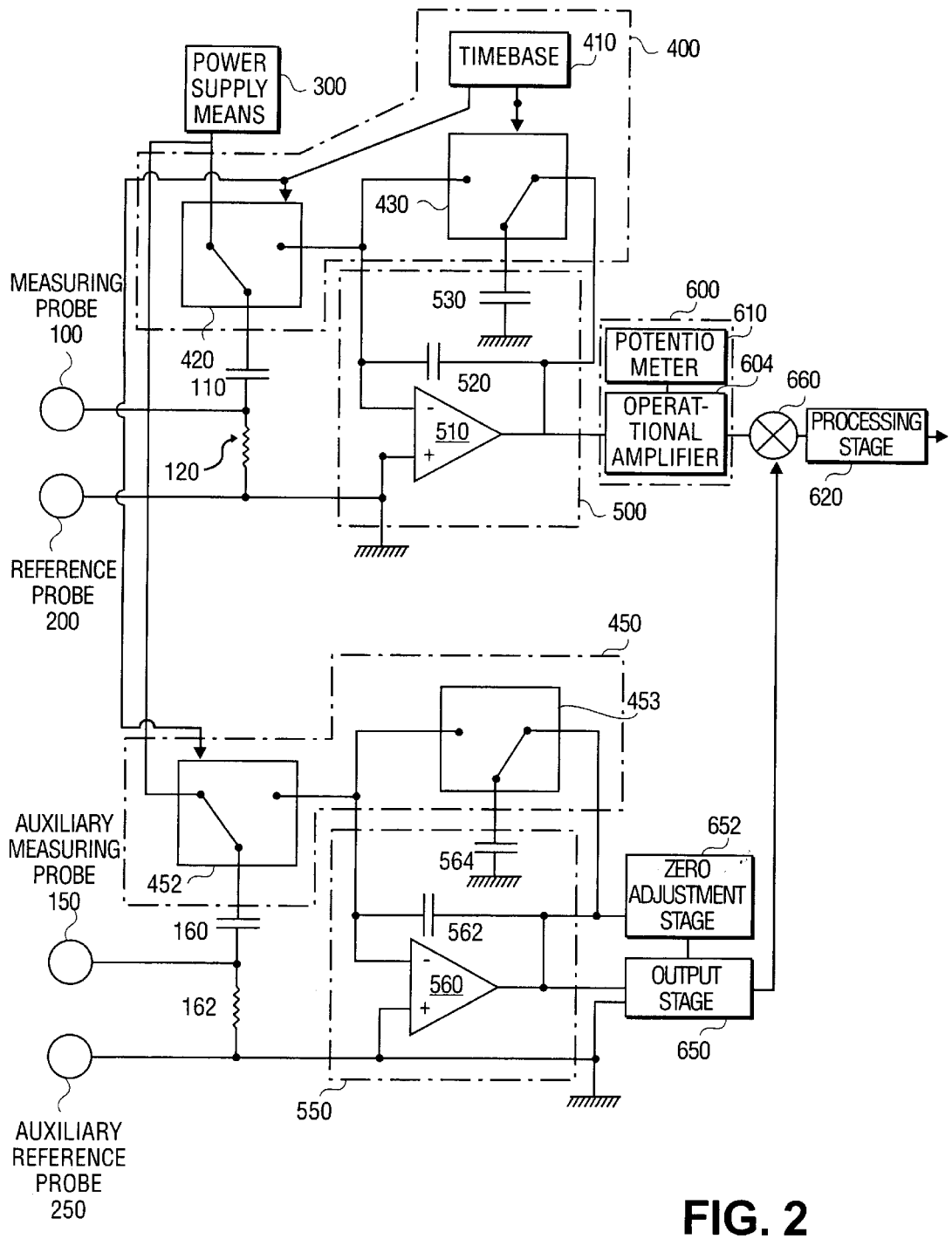
FIG. 2 shows a variant of this device including an auxiliary measuring probe providing a permittivity correction.

The device shown in FIG. 2 includes a measuring probe 100, a reference probe 200, electrical power supply means 300, control means 400 and an integrator stage 500 as described previously with reference to FIG. 1.

However, it is adapted to take account of any change in the permittivity of the medium between the measuring probe 100 and the reference probe 200, for example for measurements in a tank that can contain different products in succession. To this end, the device shown in FIG. 2 includes an auxiliary measuring probe 150, an auxiliary reference probe 250, auxiliary control means 450 and an auxiliary integrator stage 550.

The auxiliary measuring probe 150 and the auxiliary reference probe 250 are designed to be placed in the same medium as the measuring probe 100 and the reference probe 200. The auxiliary measuring probe 150 and the auxiliary reference probe 250 form compensator probes. By way of non-limiting example, and as shown in FIG. 8, the auxiliary measuring probe 150 and the auxiliary reference probe 250 can be placed in the lower part of a tank containing a product whose level is to be measured.

The auxiliary reference probe 250 is at the same earth potential as the reference probe 200.

The auxiliary control means 450 include two two-way switches 452, 453 controlled by the timebase 410 at the same timing rate as the switches 420, 430, respectively.

Thus, if necessary, during the sequences T1 the switch 452 connects the output of the power supply means 300 to the auxiliary measuring probe 150 via capacitive injectors 160 and connects the auxiliary measuring probe 150 to the inverting input of an operational amplifier 560 which is part of the integrator stage 550 during the times T2.

FIG. 2 shows that, if necessary, a resistive injector 162 can be inserted between the auxiliary measuring probe 150 and the auxiliary reference probe 250, in a similar manner to the resistive injector 120.

The integrator stage 550 includes two capacitors: a reference capacitor 562, analogous to the capacitor 520, connected between the inverting input and the output of the operational amplifier 560, and a capacitor 564 which has one terminal connected to ground and the other terminal connected via the switch 453 to the output of the operational amplifier 560 during the times T1 and the inverting input of the amplifier 560 during the times T2.

The non-inverting input of the amplifier 560 is connected to the circuit ground.

A calibration voltage VS2 proportional to the permittivity of the analysed medium is obtained at the output of the operational amplifier 560 at the output of the integrator stage 550.

This signal can be shaped in an output stage 650 receiving a zero adjustment voltage from a stage 652 equivalent to the means 604, 610 essentially described previously for the stage 600 with reference to FIG. 1.

Here the output of the stage 650 is used to monitor the gain of a control stage 660 also receiving the output of the shaping stage 600 associated with the main probes 100 and 200. This to make the measurement insensitive to variations in the permittivity of the analysed medium.

The output of the stage 660 can be connected to any processing circuit 620, for example, and as described with reference to FIG. 1, a 4–20 mA current loop or a processing stage adapted to generate a spectrum characterizing the product analysed, for example.

The preferred embodiment of the present invention shown in FIG. 3 will now be described.

Figure 3:
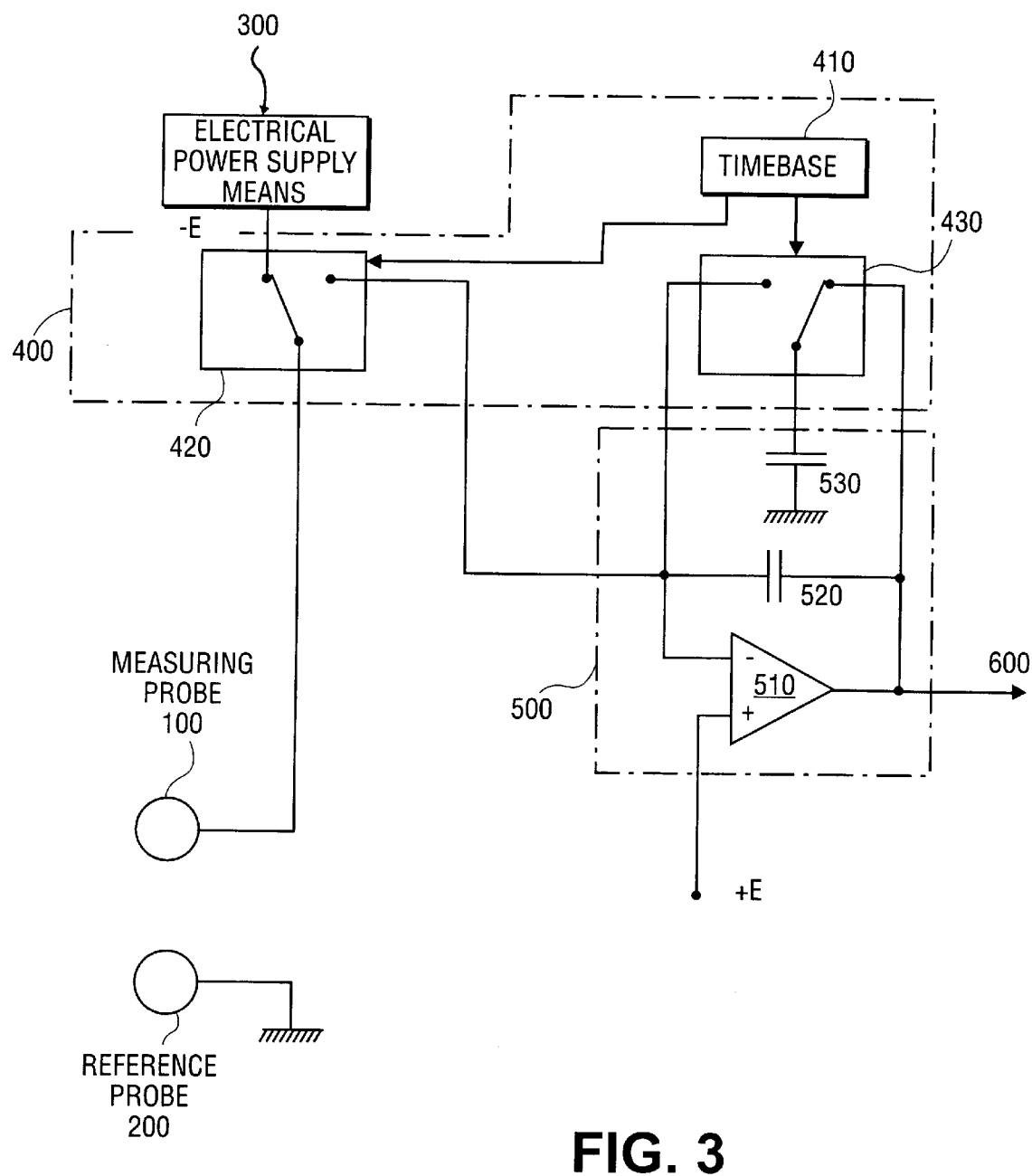
FIG. 3 shows a preferred embodiment of the present invention including means for applying a null average voltage to the measuring probe.

FIG. 3 shows a measuring probe 100, a reference probe 200, power supply means 300, control means 400 and an integrator stage 500 as previously described with reference to FIG. 1.

However, the circuit shown in FIG. 3 neutralizes hysteresis of the accumulated charge on the measuring probe 100 and discharges it completely in each cycle controlled by the control means 400.

To this end, as shown in FIG. 3, the non-inverting input of the operational amplifier 510 is connected, not to the potential of the reference probe 200 (i.e. to ground), but to a potential of the opposite sign, relative to the potential of the reference probe 200, to the potential applied by the means 300 to the measuring probe 100.

For example, for a duty factor of 1, i.e. for T1=T2, the electrical power supply means 300 can apply a pulsed voltage of amplitude −E to the measuring probe 100 and the non-inverting input of the operational amplifier 510 can be connected to a voltage +E of the same amplitude as but of the opposite sign to the aforementioned voltage −E.

To neutralize hysteresis, during the times T2 the measuring probe therefore receives a voltage which is the opposite of that applied during the times T1 via the switch 420 and the operational amplifier 510.

More generally, for a duty factor p defined by the timebase 410, i.e. T1=p.T2, a potential +E2 is preferably applied to the non-inverting input of the operational amplifier 510 and its absolute amplitude is equal to p times that of the supply voltage −E1 supplied by the circuit 300 to the measuring probe 100. The average value of the voltage applied to the measuring probe 100 is therefore a null voltage.

Note also that the resulting circuit naturally biases the input operational amplifier 510 by means of a continuous current flowing relative to the virtual ground potential +E and enables the charge sampled by the switching capacitor 530 to be subtracted from the continuous current, which makes it possible to measure extremely small charges and to obtain an analog signal corresponding to a count of the charges resulting from the integration of the signal, with no need for any output sample and hold.

In another embodiment of the present invention the non-inverting input of the operational amplifier 510 can be connected to the circuit ground (i.e. to the potential of the reference probe 200) during the times T1 and to the potential +E only during the times T2 and via a switch controlled by the timebase 410.

The structure of a spectrum recognition module. processing the signal from the integrator stage 500 to identify the analysed medium between the measuring probe 100 and the reference probe 200 will now be described with reference to FIG. 4.

Figure 4:
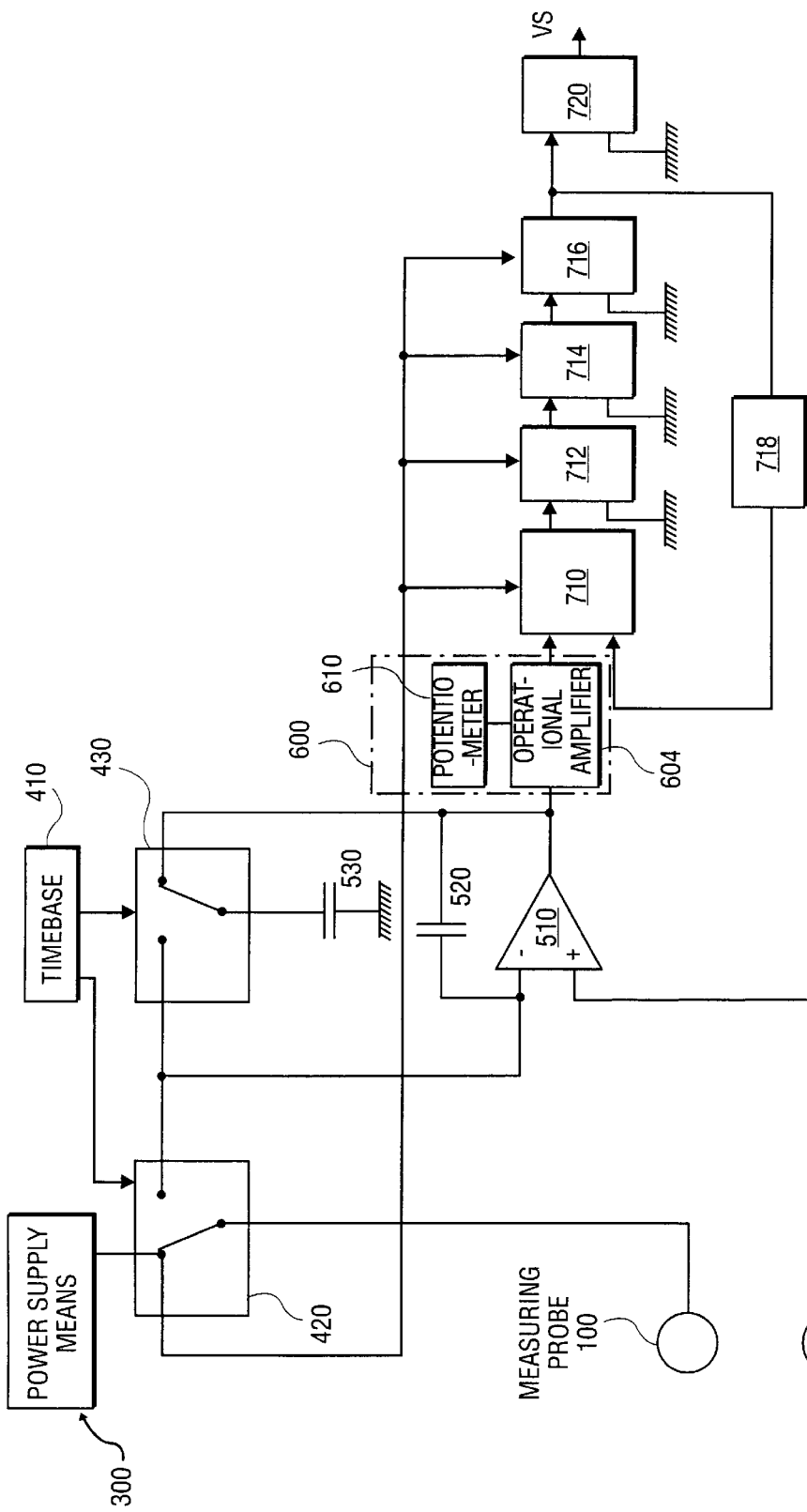
FIG. 4 is a schematic representation of an embodiment of the device according to the present invention adapted to determine a spectrum of an analysed product.

FIG. 4 shows, in addition to the measuring probe 100 and the reference probe 200, electrical power supply means 300, control means 400 and an integrator stage 500 as described previously with reference to FIG. 1 or FIG. 3.

The signal available at the output of the integrator stage 500 can be shaped in an output stage 600 receiving a reference voltage or zero adjustment voltage from a stage 610.

The essential function of the additional processing means 700 shown in FIG. 4 is to amplify very strongly the signal from the upstream.stage 600 in order to detect fluctuations of that signal and then to digitize it and finally to calculate its spectrum. They include first of all a stage 710 whose function is to transform the sampled signal from the means 600 into squarewave signals whose amplitude is proportional to the permittivity of the product analysed. The output of the stage 710 drives the input of a high-gain high-pass amplifier 712. The amplified signal is applied to a synchronous detector 714 adapted to restore the information relative to the reference potential of the module (electrical earth). The signal is then passed to an integrator 716 whose time constant is very large compared to the sampling period. A feedback branch 718 connects the output of the integrator 716 and an input of the shaping stage 710.

A very strongly amplified and fluctuating signal is therefore obtained at the output of the integrator 716.

The output of the integrator stage 716 is connected to a signal processing stage 720.

The processing stage 720 includes:

an analog/digital converter supplying digital values from the analog signal from the integrator stage 716, a control unit controlling storage means storing the digital values of the signal, and calculating means, for example a DSP, a microcontroller or a microprocessor.

The aforementioned calculating means:

perform recursive digital filtering, calculate Fourier transforms and spectral densities in real time or off-line with a number of points and a sufficient and fine resolution, using conventional windowing techniques (rectangular, Hamming, etc windows) or overlapping techniques, calculate crossed spectra in real time or off-line over sliding time intervals, calculate sliding averages in the time and frequency domain, and calculate correlation and intercorrelation functions in the time or frequency domain and if necessary search a digital database storing characterized signatures.

On the basis of Fourier transforms calculated in real time at time intervals chosen according to the selected frequency resolution and response time (number of points, sampling frequency), the module 720 searches the frequency band with the highest energy spectral density (ESD). Over a particular number No of consecutive points, the module 720 calculates the sliding average of the ESD. In real time it compares the ESD in a given frequency band to another one. Immediately a ratio K is reached, the ambiguity is resolved. The value No, the ratio K and the frequency bands chosen depend on the substance analysed.

If necessary, to improve accuracy, the same calculation can be performed but the crossed spectra calculated for two consecutive Fourier transforms (Sc=(Sn−1)*(Sn*)) are processed rather than processing the Fourier transforms directly.

When the spectrum has been obtained, the module 720 calculates and looks for correlations with digital spectra stored in a database. The module 720 can resolve the ambiguity on the basis of a correlation value defining an acceptable degree of confidence.

The measuring probe 100 and the reference probe 200 can be connected to the processing means 500 by a two-wire cable, preferably a shielded cable, or by a coaxial cable whose core is connected to the measuring probe 100 and whose outer shield is connected to the reference probe 200.

The present invention finds applications in many fields. The following may be cited by way of non-limiting example:

measuring levels, for example the levels of:
  electrically conductive or insulative liquids or powder materials, or
  petroleum products such as liquefied petroleum gas (LPG), through continuous level measurements or by sensing the level at particular markers, functioning for example as high-level and low-level detectors, regardless of the nature of the tanks concerned, for example whether they are made of metal or plastics material, discrimination of products, for example:
  determining the quality of oil in the automotive area,
  in the area of petroleum products,
  metering and monitoring product quality in the foodstuffs area, and
  even in any other field, for example detecting a type of product in a pipe, for instance discriminating between water and gas in a plastics material pipe, in particular a polyvinyl chloride (PVC) pipe, person and intruder detection, and in particular:
  intruder detection applied to the protection of objects of all kinds,
  intruder detection applied in particular to protecting works of art,
  intruder detection applied to protecting showcases in a shop,
  sensing a person on an automobile seat to identify their position for intelligent control of various units of the automobile vehicle, such as airbags, the position of the steering column, the height of the steering wheel or the orientation of the rear-view mirrors,
  sensing persons or detecting intruders for alarm or counting applications,
  detecting objects for counting applications, and
  sensing persons applied to a tactile keypad.

A series of applications of the present invention to level detection will now be described with reference to FIGS. 5 to 13.

FIG. 5 is a diagrammatic representation of an embodiment in which the reference probe 200 is an electrically conductive, for example metal, tank 10 containing an electrically conductive or insulative liquid or powder whose level is to be measured. In this case the measuring probe 100 is a conductive body inside the tank 200, for example a circular section rod, and is preferably positioned vertically so that it dips into the medium to be analysed. The measuring probe 100 preferably has a constant cross section throughout its length. The measuring probe 100 must of course be separated from and spaced from the reference probe 200 formed by the tank. The measuring probe 100 and/or the reference probe 200 must be coated with an electrically insulative coating if the product to be analysed contained in the tank 200 is electrically conductive.

The measuring probe 100 and the reference probe 200 are connected to the processing and analysis means 500 previously described by connecting means 20, 22.

By way of non-limiting example, for a cylindrical measuring probe 100, the voltage obtained at the output of the integrator stage 500 is of the form:

$$VS = (E \cdot \eta \cdot 2 \cdot \pi \cdot \varepsilon c \cdot G \cdot H) \Big/ \left( \left[ \text{LOG} \frac{(R+e)}{R} \right] + \frac{\varepsilon m \cdot e}{\varepsilon c \cdot R} \right)$$

in which:
  $\eta = 0.5 = T2/(T1+T2)$ is the duty factor neutralizing the residual hysteresis of charges,
  $\varepsilon m$ is the permittivity of the liquid analysed,
  $\varepsilon c$ is the permittivity of the coating of the probe,
  G is the gain of the system,
  R is the radius of the measuring probe 100,
  e is the thickness of the insulative coating on the measuring probe 100,
  H is the depth of the conductive liquid or the powder, and
  E is the value of the applied field.

FIG. 6 shows an embodiment in which the reference probe 200 is not the tank 10 containing the fluid to be analysed but an electrically conductive material cylinder surrounding the measuring probe 100 and incorporating apertures to enable direct fluid communication between the interior volume of the tank 10 and the interior volume of the reference probe 200 accommodating the measuring probe 100.

Of course, the measuring probe 100 and/or the reference probe 200 must be coated with an electrically insulative material which is not porous to the fluid to be analysed if the fluid is electrically conductive.

FIG. 7 shows an embodiment in which the reference probe 200 is an electrically conductive body disposed in the tank 10 and at least substantially parallel to the measuring probe 100.

FIG. 8 shows an embodiment compatible with the processing circuit shown in FIG. 2.

FIG. 8 shows a measuring probe 100 and a reference probe 200 (here as in the FIG. 7 embodiment, although it could conform to any other embodiment of the invention), associated with two electrodes 150, 250 which are located near the bottom of a tank containing a fluid to be analysed so that they are always immersed in it. They are connected to the integrator stage 550 by electrically insulated connections.

FIG. 9 shows an embodiment designed to provide binary detection of high and low levels.

FIG. 9 shows a reference probe 200 connected to the electrically conductive material tank 10 (but which could instead be a body separate from the tank and placed therein), and two measuring probes 100, 100' at the high and low levels to be detected, respectively. The two measuring probes 100, 100' are successively connected to power supply means and to respective integrator stages 500 by respective two-way switches 420 as described previously with reference to FIG. 1.

The output voltage of the associated integrator stage 500 varies if the fluid analysed is above or below the level of the measuring probe 100 or 100' concerned. Consequently, it is sufficient to compare the output signal of the integrator stages 500 and a reference signal to determine whether the high or low level in the tank has been reached.

Of course, there could instead be a single measuring probe detecting only the high level or only the low level, for example, or more than two measuring probes staggered along the height of the tank to detect respective levels.

FIG. 10 shows an embodiment including two measurement probes 100 in a tank 10 and respectively at a high level and a low level to be detected and a reference probe 200 in the tank and near its bottom.

Figure 11:
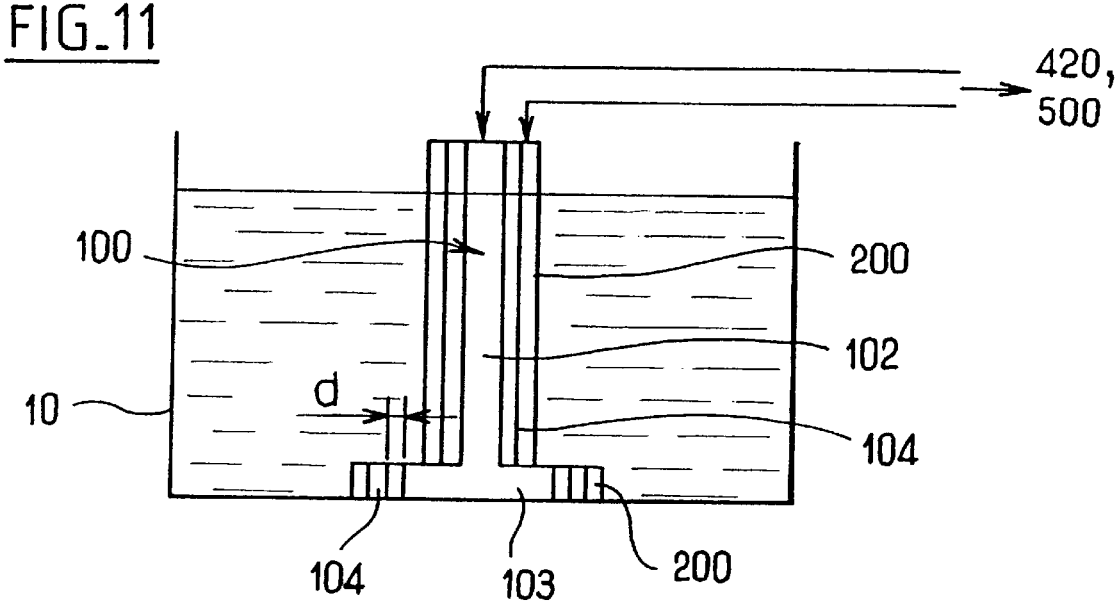

FIG. 11 shows an embodiment which is preferably used to identify the product analysed, for example, to measure the quality of the oil in an automobile vehicle or to discriminate the quality of food products or petroleum products. FIG. 11 shows a measuring probe 100 comprising a vertical electrically conductive material rod 102 which terminates at the bottom in a circular ring 103. The vertical rod 102 of the measuring probe 100 is covered with an electrically insulative material 104 which is in turn covered by a reference probe 200. Likewise the ring 103. However, at the level of the bottom ring 103 the reference probe 200 is spaced from the insulation 104 (or the measuring probe 100 is spaced from the insulation 104) by a distance d to allow the fluid to be analysed to enter the space defined in this way between the insulation 104 and the reference probe 200 or the measuring probe 100.

Thus only the lower parts of the measuring probe 103 and the reference probe 200 are actively involved in discriminating the product to be analysed.

Of course, a simple detector device like that shown in FIG. 5 can be used to discriminate or identify an analysed product through direct processing of the signal obtained representative of the permittivity of the medium between the two probes 100 and 200, instead of using it to detect a level.

Figure 12:
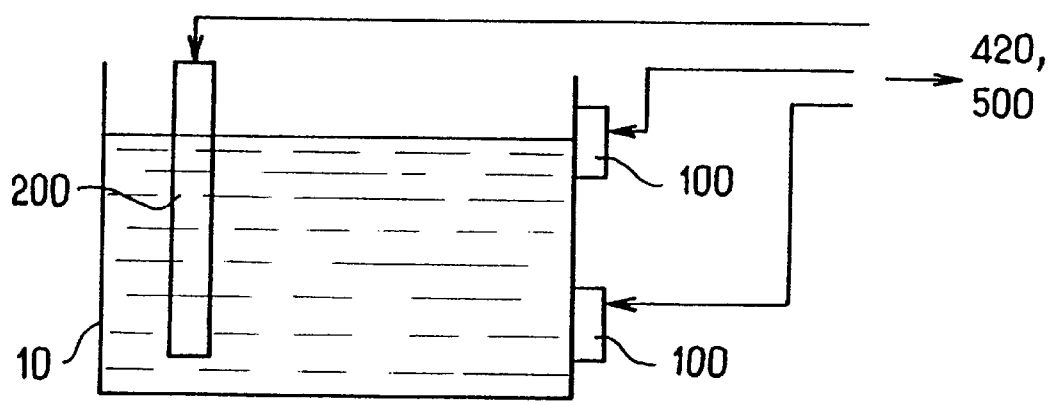

FIG. 12 shows an embodiment for detecting levels, similar to that shown in FIGS. 9 and 10, in which the measuring probes 100 are outside the tank 10. This embodiment typically applies to a tank formed of an electrically insulative material.

Figure 13:
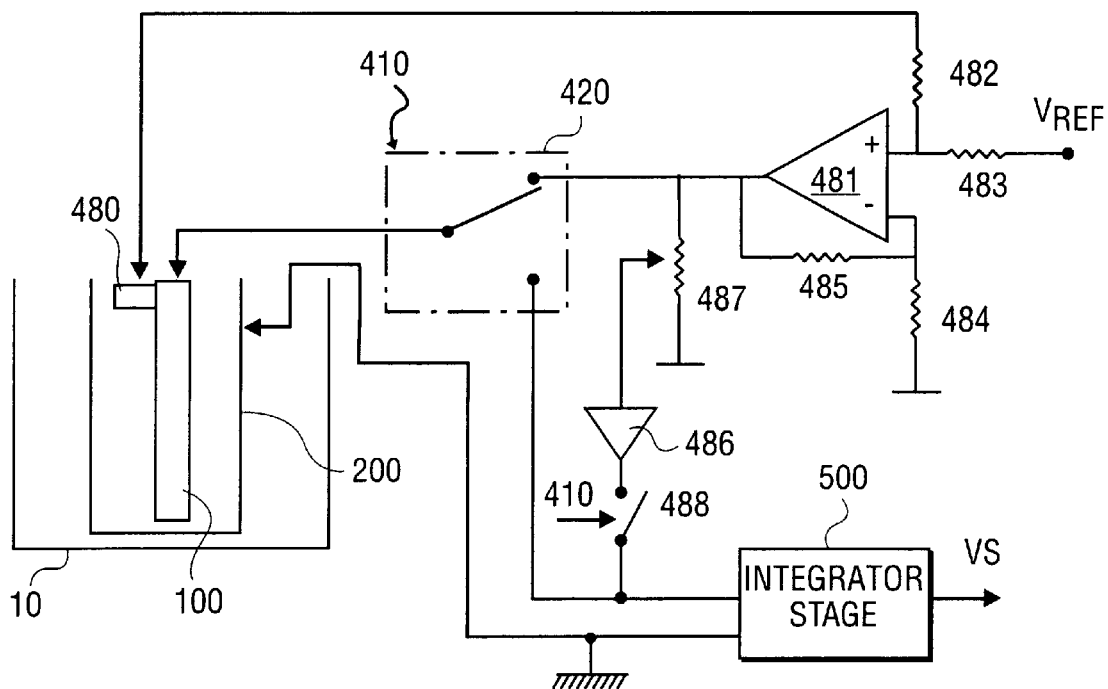

FIG. 13 shows another embodiment including a temperature sensor 480 for applying compensation to the measurement.

FIG. 13 shows a measuring probe 100 and a reference probe 200 of the type shown in FIG. 6. The invention is not limited to this embodiment, however. It can be applied to any other geometry and arrangement of the probes according to the invention.

Moreover, the temperature probe shown in FIG. 13 is placed over the measuring probe 100. The temperature probe 480 can instead be placed anywhere else, however.

The output signal of the temperature probe 480 shown in FIG. 13 is used to correct the value of the voltage –E applied to the measuring probe 100 during the times T1 and to define a correction voltage applied to the input of the integrator stage 500 during the same times T2.

In this case, the voltage –E is obtained at the output of an operational amplifier 481 whose non-inverting input is connected to the output of the temperature sensor 480 by a resistor 482 and to a fixed reference voltage via a resistor 483.

The inverting input of the operational amplifier 481 is connected to ground by a resistor 484 and to its output by a resistor 485.

There is therefore obtained at the output of the amplifier 481 a voltage –E which varies in the opposite direction to the temperature, so compensating changes with temperature of the permittivity of some liquids.

The output of the amplifier 481 is connected to the measuring probe 100 via the aforementioned two-way switch 420.

The correction voltage is sampled by an inverting amplifier 486 at the cursor of a potentiometer 487 between the output of the amplifier 481 and ground.

The output of the inverting amplifier 486 is connected to the input of the integrator stage 500 during the time T2 via a switch 488 controlled by the timebase 410.

A circuit applying a temperature correction by means of components 480 to 488, as shown in FIG. 13, can be used in a simple application to the discrimination of a product without measuring the level.

In a further embodiment of the invention, to apply a correction as a function of the measured permittivity of the medium, the feedback applied to the operational amplifier 481 via the resistor 482 can come from a processing stage receiving a signal from a measuring probe similar to the probe 150 shown in FIG. 8, instead of from a temperature sensor.

As a general rule, in the context of the present invention, the initial offset voltage can be compensated in two ways: a) by neutralizing the initial offset by means of an amplifier following on from the capacitor switching system 600 and by applying a voltage of the opposite sign to the field applied to the summation point of the operational amplifier 510, or b) by applying synchronously to the summation point of the capacitor switching amplifier 600, during the counting of the charges, a voltage of opposite sign to the applied field.

Figure 14:
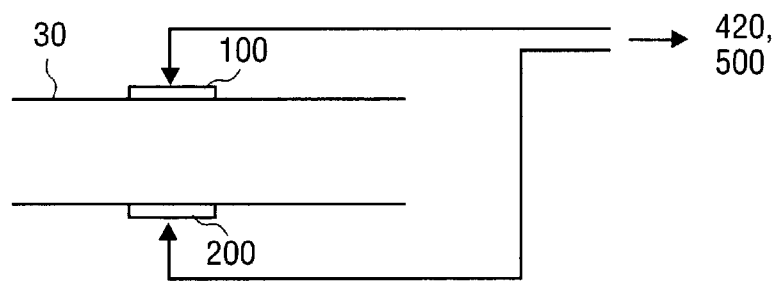
FIG. 14 shows an application to the detection of a product in a pipe.

FIG. 14 shows an embodiment for detecting or discriminating products, for example for discriminating between solid, liquid or gas products, such as water or gas, in a non-conductive duct 30. To this end, FIG. 14 shows a measuring probe 100 and a reference probe 200 placed on the wall of the duct 30, for example in a diametrically opposed arrangement, although this is not limiting on the invention. The measuring probe 100 and the reference probe 200 can be shifted axially or at angular positions that are not diametrically opposed. If necessary the probes 100 and 200 are protected from the media flowing in the duct 30 by a coating which is sealed against those media. A device of this kind can in particular detect the presence of water in a gas.

The integrator stage 500 forming a charge counting system delivers at its output a voltage proportional to the permittivity of the product between the electrodes 100 and 200. The ratio between the permittivity of water and the permittivity of most gases being greater than 15, such means can easily discriminate the presence of water or gas in the duct.

FIG. 15 shows an embodiment applied to intruder detection. In this case, the measuring probe and the reference probe are conductive bodies, for example electric wires, which are routed along an area under surveillance. By way of non-limiting example, the distance between the two probes 100 and 200 can be of the order of 5 cm.

More generally, in the context of the present invention, the distance between the two probes 100 and 200 is typically from 1 to 10 cm and preferably of the order of 5 cm.

Non-significant areas of the bodies constituting the probes 100, 200 can be partly electrically insulated or shielded over their length. Such local insulation or shielding can be achieved by surrounding the measuring probe 100 locally with a conductive sheath 40 referred to the potential of the reference probe 200. Any movement of a person or object in the environment of the probes 100, 200 modifies the permittivity of the medium and therefore varies the output voltage of the integrator stage 500 and so the intrusion is detected. For example, the circuit according to the invention can detect movement at up to 40 cm from the probes with a voltage of the order of 4 volts between the measuring probe 100 and the reference probe 200.

It has been found that the environment can eventually generate a drift or offset voltage as a function of ambient temperature and relative humidity. As shown in FIG. 15, this can be corrected with the aid of a module 730 which calculates the average value of the drift and corrects the signal accordingly. In this context, a distinction can be drawn between intrusion into, addition of an object to and removal of an object from the environment of the probes 100 and 200, according to the positive or negative sense in which the detected voltage at the output of the stage 500 changes.

Correction based on the change of the ambient permittivity as a function of relative humidity and temperature in particular can instead be obtained with the aid of a reference signal generated by an additional integrator stage controlled by additional measuring and reference probes placed in the same environment as the detector measuring and reference probes, but at a location that is not accessible to an intruder and therefore not responsive to such influence.

A variant of the device shown in FIG. 15 can be used to protect a painting or work of art or the like.

For this it is sufficient to place the two probes 100 and 200 near the work to be protected so that any movement of the work or entry into the environment of the probes generates a variation of the output signal of the associated integrator stage 500.

Of course a respective pair of probes 100, 200 dedicated to each object under surveillance can be provided, or one pair of probes 100, 200 can be associated with a set of objects under surveillance, for example in a showcase or at a demonstration or exhibition. In the latter case it is sufficient for the two probes 100, 200 to be long enough to encompass all of the environment of the objects in question. The probes 100, 200 can be under or behind the support for the objects under surveillance. Once again, as for the other embodiments of the present invention, the probe connecting wires, which have no detection function, must be neutralized to prevent false alarms. Moreover, the location of the objects, for example a table, display unit or showcase, must not be metallic or include electrically grounded conductive structures.

FIG. 16 is a diagrammatic representation of an embodiment of the system for detecting the presence and/or the position of a user on a seat 50, for example a vehicle or aircraft seat. A system of this kind can be used to detect the position, direction or presence of a user, for example, in order to provide intelligent control of an airbag in the event of a collision.

In this case, the seat is preferably equipped with several pairs of measuring probes 100 and reference probes 200 disposed under the upholstery of the seat, for example, facing characteristic areas, for example the legs, back, shoulders and head. The outputs from the probes can be directed to respective processing stages or to a common processing stage via a multiplexer.

The signals delivered by the probes can be processed in many different ways. By way of non-limiting example, a computer can sum the signals from each of the probes, applying a particular weighting.

A device of this kind can distinguish a child from an adult, for example, and control an airbag accordingly, to avoid injuring the user.

Figure 17:
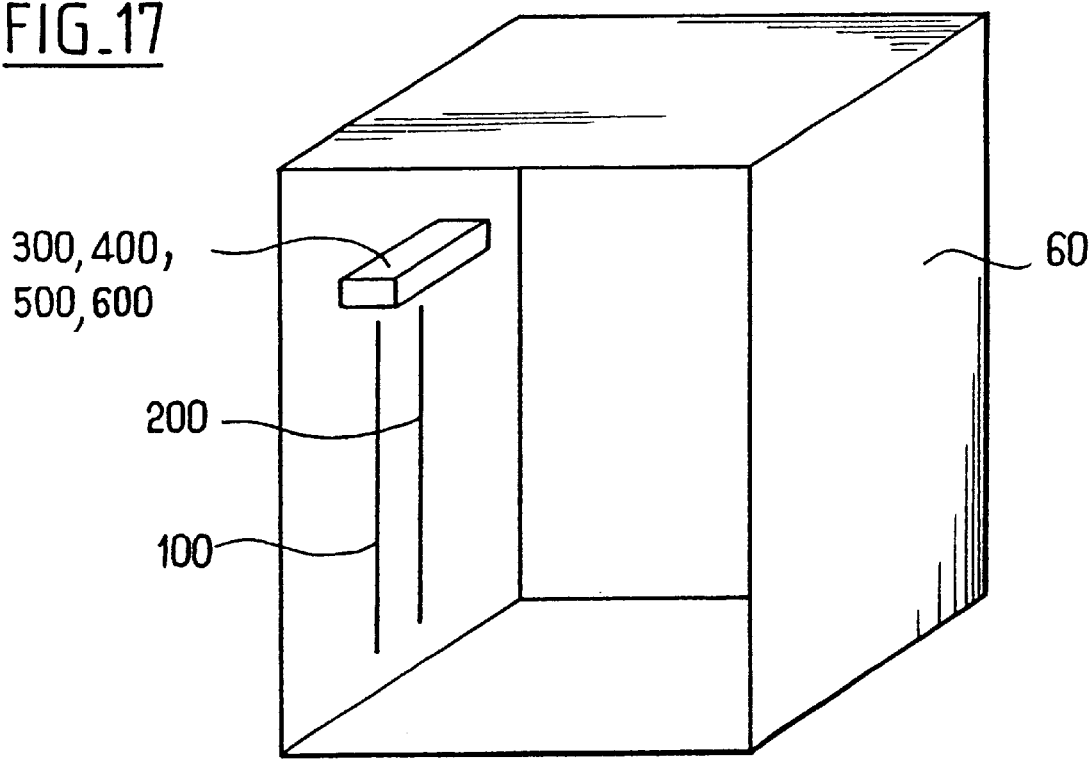
FIG. 17 shows an application to detecting passage through a doorway.

FIG. 17 shows an embodiment for detecting the passage of persons or objects through a doorway 60, for example for counting or alarm purposes.

In this case, the measuring probes 100 and the reference probe 200 are parallel to a wall of the doorway 60, for example a vertical lateral wall. By way of non-limiting example, the two probes 100, 200 can take the form of electrical wires extending the full height of the doorway 60 and separated from each other by a distance of the order of 5 cm. The doorway 60 preferably includes no other earthed electrically conductive, in particular metal, structures.

Figure 18:
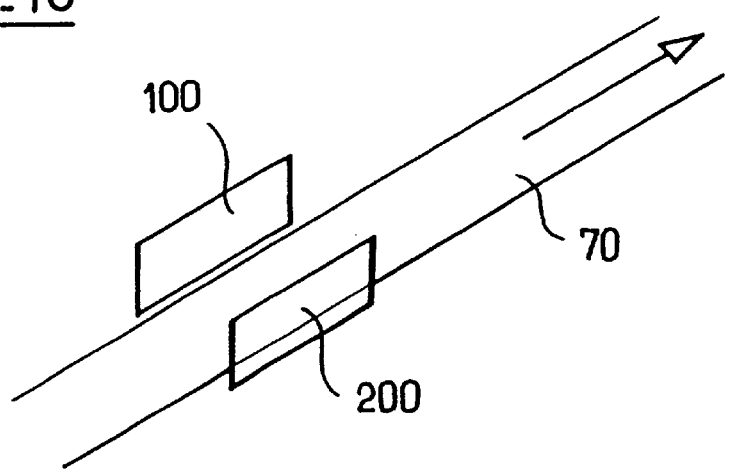
FIG. 18 shows an application to detecting objects conveyed by a conveyor belt.

The same type of device can be used to detect the passage or movement of objects or to count them. By way of non-limiting example, a measuring probe 100 and a reference probe 200 can be used for this, placed on respective opposite sides of a conveyor 70 along which the objects move, as shown in FIG. 18, or juxtaposed along the conveyor.

Figure 19:
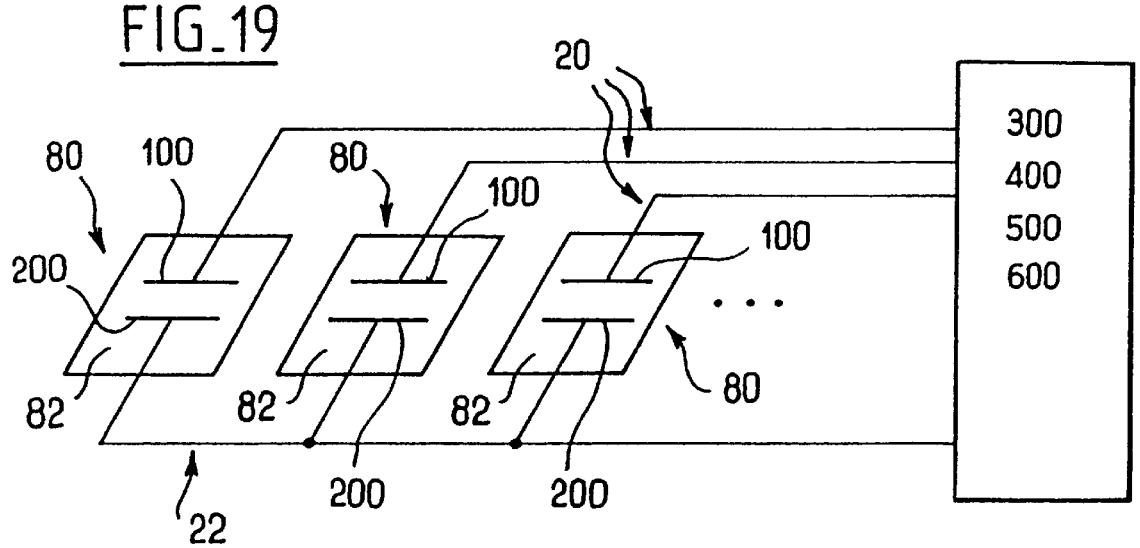
FIG. 19 shows an application to a keypad.

FIG. 19 is a diagrammatic representation of an embodiment of the invention which takes the form of a keypad. Each of the keys 80 is formed by two areas of an electrically conductive material, respectively forming a measuring probe 100 and a reference probe 200, disposed on a support 82, preferably under a screenprinted electrically insulative screen, formed of a sheet of plastics material, for example. The two probes 100 and 200 can be a few millimetres apart, for example. The permittivity of the medium surrounding the probes 100 and 200 varies when the user's fingers approach the corresponding detection areas materialized by the probes, which varies the output level of an associated charge integrator stage. The probes 100 and 200 are connected to the processing means 500 by any connecting means 20, 22. The connecting means formed in this way must be neutralized outside the required detection areas by shielding them to prevent spurious detection if the user's fingers approach these connecting areas. The reference probes 200 are preferably all connected together. Each key formed by a pair of probes 100 and 200 can be connected to a respective integrator stage 500. However, the various keys are preferably connected to a common integrator stage via a multiplexer. In this case, each key is scanned successively by the aforementioned sequences T1, T2 and a change in the output signal of the integrator stage 500 is attributed to the synchronously scanned key.

Figure 20:
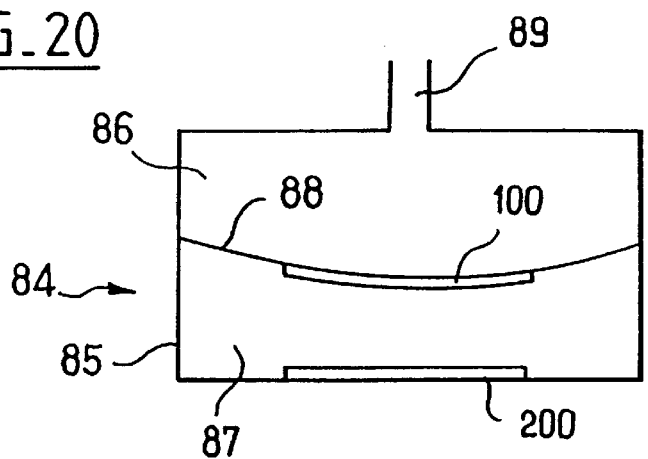
FIG. 20 shows an application to a pressure sensor.

FIG. 20 shows another embodiment of the present invention, forming a pressure sensor. In this case, the two probes 100 and 200 are placed on respective parts of a sensor capable of relative movement due to the effect of applied pressure. As shown in the figure, the sensor 84 has a housing 85 divided into two chambers 86, 87 by a flexible membrane 88 which is deformable due to the pressure fed into a first chamber 86 via an inlet 89. One of the two probes, here the measurement probe 100, is placed on the deformable membrane 88 and the other, here the reference probe 200, is placed on a fixed wall of the sensor housing, for example the bottom wall of the second chamber 87, or vice versa. The second chamber 87 can be closed or vented to the atmosphere or communicate with a reference pressure. The deformable membrane 88 can be associated with a calibrated load spring or not. The probes 100 and 200 are connected to an integrator stage 500 by connecting means, for example a flexible conductor in the case of the probe on the deformable membrane. The output voltage of the integrator stage 500 associated with the sensor shown in the figure varies in inverse proportion to the distance between the probes 100 and 200 reflecting variations in pressure.

Figure 21:
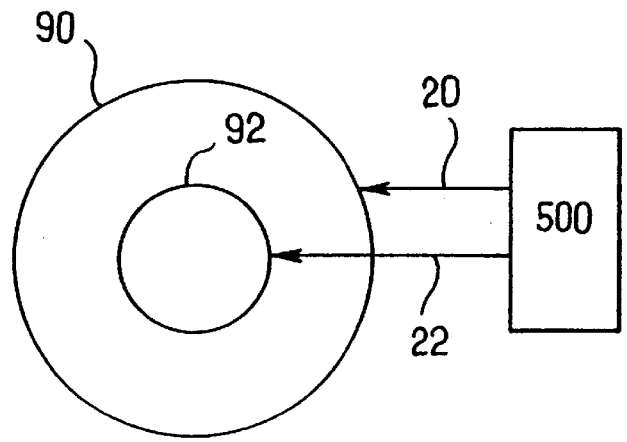
FIG. 21 shows an application to a pneumatic pressure detector.

FIG. 21 shows another embodiment of the present invention, forming a sensor responsive to the inflation of a tyre 90. In this case a measuring probe 100 and a reference probe 200 are placed in respective areas of the tyre or the associated structure so that they move relative to each other depending on the inflation of the tyre. By way of non-limiting example, the measuring probe 100 is the radial metal casing of the tyre 90 and the reference probe 200 is the rim or a metal strip applied to the rim 92 and insulated from it by an electrically insulative material, such as an elastomer, or vice versa. The probes 100 and 200 are connected to an integrator stage 500 on the rim by connecting means, for example a shielded connector 20/22. The distance between the two probes 100 and 200 varies according to the inflation of the tyre. This therefore applies also to the output signal of the integrator stage 500. The corresponding information is transmitted between the rim and the hub of the vehicle, or more generally its bodywork, by connecting means such as an electromagnetic transponder or an optical connection.

Of course, the present invention is not limited to the embodiments previously described, but encompasses all variants conforming to the spirit of the invention.

The present invention has many advantages over prior art measuring devices.

In particular it provides a very sensitive circuit that can measure capacitance values as low as a few hundred femtocoulombs, for example.

The present invention can also be used to implement detector means with perfect galvanic isolation, which are therefore totally safe for the user. All that is required is to protect the probes 100 and 200 with a totally electrically insulative screen, for example a tactile screen. A device of this kind finds an application in the management of utilities in a sensitive environment such as a bathroom, for example. In this case the invention takes the form of a panel made up of various areas or keys each of which is associated with a respective measuring sensor 100 to control a specific function, for example valve open/shut, flowrate adjustment, hot water, cold water, or any equivalent function, for example by means of an electromechanical device.

What is claimed is:

1. Measuring device employing indirect measurement of permittivity and including two electrically conductive bodies respectively constituting a measuring probe (100) and a reference probe (200), electrical power supply means (300) adapted to deliver a DC electrical voltage of controlled amplitude, an integrator stage (500) including a capacitor switching system (530) and control means (400) adapted to define a cyclic series of two sequences at a controlled frequency, namely a first sequence (T1) during which the electrical power supply means (300) are connected to the measuring probe (100) to apply an electric field between the measuring probe (100) and the reference probe (200) and accumulate electrical charge on the measuring probe (100) and a second sequence (T2) during which the electrical power supply means (300) are disconnected from the measuring probe (100) which is connected to a summation point of the integrator stage (500) to transfer its charge into the integrator stage (500) and obtain at the output thereof a signal representative of the permittivity between the measuring probe (100) and the reference probe (200), characterized in that the integrator stage (500) includes an operational amplifier (510), a first integrator capacitor (520) constituting a feedback capacitor of said amplifier (510) and a second capacitor (530) switched between the output and the input of the operational amplifier (510) at the timing rate of the sequences (T1, T2) controlled by the control means (400), so that under steady state conditions there is obtained at the output of the operational amplifier (510) an "equilibrium" voltage $V_S$ equal to $-E \cdot Cs/C530$ where $-E$ is the amplitude of the voltage at the terminals of the electrical power supply means (300), Cs is value of the capacitor defined between the measuring probe (100) and the reference probe and C530 is the value of the second switched capacitor (530).

2. Device according to claim 1 characterized in that the switched capacitor (530) has a capacitance of the same order of magnitude as the capacitance between the measuring probe (100) and the reference probe (200).

3. Device according to claim 1 characterized in that the integrator capacitor (520) is connected between the inverting input and the output of the operational amplifier (510).

4. Device according to claim 1 characterized in that the switched capacitor (530) is connected to the output of the operational amplifier (510) during the sequences (T1) of supply of power to the measuring probe (100) and to the input of the operational amplifier (510) during the sequences (T2) of connection of the measuring probe (100) to the input of that amplifier (510).

5. Device according to claim 1 characterized in that the switched capacitor (530) is switched simultaneously with the measuring probe (100).

6. Device according to claim 1 characterized in that it includes means for applying a null average voltage to the measuring probe (100).

7. Device according to claim 6 characterized in that the operational amplifier (510) receives on a second input opposite that adapted to be connected sequentially to the measuring probe (100) a voltage (+E) of opposite sign to the voltage (−E) applied by the power supply means to the measuring probe.

8. Device according to claim 7 characterized in that the absolute value of voltage (+E2) applied to the second input of the operational amplifier (510) is equal to p times the amplitude of the supply voltage (−E1) delivered by the power supply means (300) to the measuring probe (100).

9. Device according to claim 1 characterized in that the control means (400) are adapted to define a duty factor of 50%, i.e., two successive sequences (T1, T2) of the same duration.

10. Device according to claim 1 characterized in that the control means (400) are adapted to apply a stepped voltage to the measuring probe (100).

11. Device according to claim 1 characterized in that the control means define sequence cycles (T1 and T2) at a frequency from 5 to 50 kHz.

12. Device according to claim 1 characterized in that the capacitor (520) constituting a feedback capacitor of the operational amplifier (510) has a capacitance at least 1000 times that of the switching capacitor (530).

13. Device according to claim 1 characterized in that the integrator st age is connected to the input of a processing stage (600) including zero adjustment means (610, 612, 614).

14. Device according to claim 1 characterized in that the integrator stage (500) is connected to a processing stage (600) including full scale deflection adjustment means (606).

15. Device according to claim 1 characterized in that it further includes at least one auxiliary measuring probe (150) used to determine the permittivity of the environment of the measuring and reference probes (100, 200) and to apply a correction to the processing of the signal.

16. Device according to claim 15 characterized in that the auxiliary measuring probe (150) is near the bottom of a tank.

17. Device according to claim 15 characterized in that the correction means (150, 480) are adapted to modify the gain of a control stage (660).

18. Device according to claim 1 characterized in that it further include a temperature probe adapted to measure the temperature of the environment of the measuring probe (100) and the reference probe (200).

19. Device according to claim 1 characterized in that the correction means (150, 480) are adapted to apply compensation to the voltage applied by the power supply means (300) to the measuring probe (100).

20. Device according to claim 1 characterized in that the correction means (150, 480) are adapted to generate a correction voltage applied to the input of the integrator stage (500).

21. Device according to claim 1 characterized in that it includes means for compensating an initial offset voltage of the integrator stage (500).

22. Device according to claim 21 characterized in that the offset voltage compensating means include an amplifier downstream of the capacitor switching system (600) adapted to apply a voltage of opposite sign to the field applied to the summation point of the integrator stage (500).

23. Device according to claim 21 characterized in that the offset compensating means include means adapted to apply a voltage of opposite sign to the applied field synchronously to the summation point of the capacitor switching amplifier (600) during counting of charges.

24. Device according to claim 1 characterized in that it further includes means for generating a signal representative of the spectrum of the medium surrounding the measuring probe (100).

25. Device according to claim 24 characterized in that the spectrum analyser means include Fourier transform calculating means and means for comparing the spectra obtained with digital spectra stored in a database.

26. Device according to claim 24 characterized in that the spectrum analyser means include a shaping stage (710), a high-gain high-pass stage (712), a synchronous detector (714), an integrator (716) and a calculation stage (720).

27. Device according to claim 1 characterized in that it includes two electrically conductive bodies (100, 200) respectively forming a measuring probe and a reference probe at distances from 1 to 10 cm, preferably of the order of 5 cm.

28. Device according to claim 1 characterized in that the measuring probe (100) and/or the reference probe (200) has an electrically insulative coating sealed against the medium surrounding the probe.

29. Device according to clam 1 characterized in that at least some sections of the connecting means (20, 22) connecting the measuring probe (100) are neutralized by an electrically conductive materials sheath at the same potential as the reference probe (200).

30. Device according to claim 1 characterized in that it is adapted to implement a function chosen from the group comprising measuring a level, discriminating products or detecting presence or intrusion.

31. Device according to claim 1 characterized in that it includes a plurality of measuring probes (100) connected to respective integrator stages (500).

32. Device according to claim 1 characterized in that it includes a plurality of measuring probes (100) connected to a common integrator .stage (500) via a multiplexer.

33. Device according to claim 1 characterized in that in constitutes a level measuring device.

34. Device according to claim 33 characterized in that the measuring probe (100) is generally vertical in a tank (10) and the integrator stage (500) is connected to processing means (600) adapted to generate a signal representative of the level of fluid in the tank (10).

35. Device according to claim 33 characterized in that the measuring probe (100) is formed by an electrically conductive area in a tank (10) at a height corresponding to a scanning level.

36. Device according to claim 33 characterized in that it includes a plurality of measuring probes (100) at respective discrimination levels in a tank (10).

37. Device according to claim 33 characterized in that the fluid to be detected is electrically conductive and the measuring probe (100) and/or the reference probe (200) has an electrically insulative coating.

38. Device according to claim 1 characterized in that the reference probe (200) is forced by the tank.

39. Device according to claim 1 characterized in that the reference probe (200) is an apertured member around the measuring probe (100).

40. Device according to claim 1 characterized in that it constitutes a device for discriminating a product flowing in a pipe (30) equipped with a measuring probe (100) and a reference probe (200).

41. Device according to claim 1 characterized in that it includes a measuring probe (100) and a reference probe (200) which run along an area under surveillance to form an intruder detector device.

42. Device according to claim 1 characterized in that it includes a plurality of pairs of measuring electrodes (100) and reference electrodes (200) arranged on a seat to detect the presence and/or the position of a user.

43. Device according to claim 1 characterized in that it includes a measuring sensor (100) and a reference sensor (200) running along a wall of a doorway (60) to form a passage detector.

44. Device according to claims 1 characterized in that it includes a measuring probe (100) and a reference probe (200) placed at the side of a conveyor belt to detect the passage of objects.

45. Device according to claim 1 characterized in that it includes a plurality of pairs of measuring probes (100) and reference probes (200) forming a tactile keypad.

46. Device according to claim 1 characterized in that the measuring probe (100) or the reference probe (200) is placed on a deformable member (88) to form a pressure sensor.

47. Device according to claim 1 characterized in that the measuring probe (100) and the reference probe (200) are placed on two areas of a tyre which can move relative to each other as a function of the inflation of said tyre to form a tyre inflation sensor.

* * * * *